United States Patent [19]
Pharaon

[11] Patent Number: 4,858,960
[45] Date of Patent: Aug. 22, 1989

[54] HOSE COUPLING LOCK

[76] Inventor: Michael Pharaon, 7182 Gibson Street, Burnaby, B.C., Canada, V5A 1P3

[21] Appl. No.: 269,462

[22] Filed: Nov. 10, 1988

[51] Int. Cl.[4] .............................................. F16L 55/00
[52] U.S. Cl. ..................................... 285/91; 285/330; 411/235; 411/353
[58] Field of Search ..................... 285/81, 87, 82, 419, 285/91, 330; 403/4, 338; 411/353, 235, 236

[56] References Cited

U.S. PATENT DOCUMENTS

| | | | |
|---|---|---|---|
| 708,104 | 9/1902 | Warner | 285/87 |
| 1,069,916 | 8/1913 | Windsor | 285/81 |
| 4,648,630 | 3/1967 | Bruch | 285/92 X |

FOREIGN PATENT DOCUMENTS

| | | | |
|---|---|---|---|
| 1022063 | 1/1958 | Fed. Rep. of Germany | 285/45 |
| 859598 | 1/1961 | United Kingdom | 285/81 |

Primary Examiner—Dave W. Arola
Attorney, Agent, or Firm—Fetherstonhaugh & Co.

[57] ABSTRACT

A locking device for a firehouse coupling having a pair of generally semi-cylindrically shaped members for embracing the coupling in the manner of a bracelet, the semi-cylindrically shaped members each having projections extending inwardly of the device for retainingly engaging projections on the firehouse.

A locking pin is provided for releasable securing the semi-cylindrically shaped members around the firehouse coupling with the inwardly extending projections in retaining engagement with the coupling projection.

10 Claims, 2 Drawing Sheets

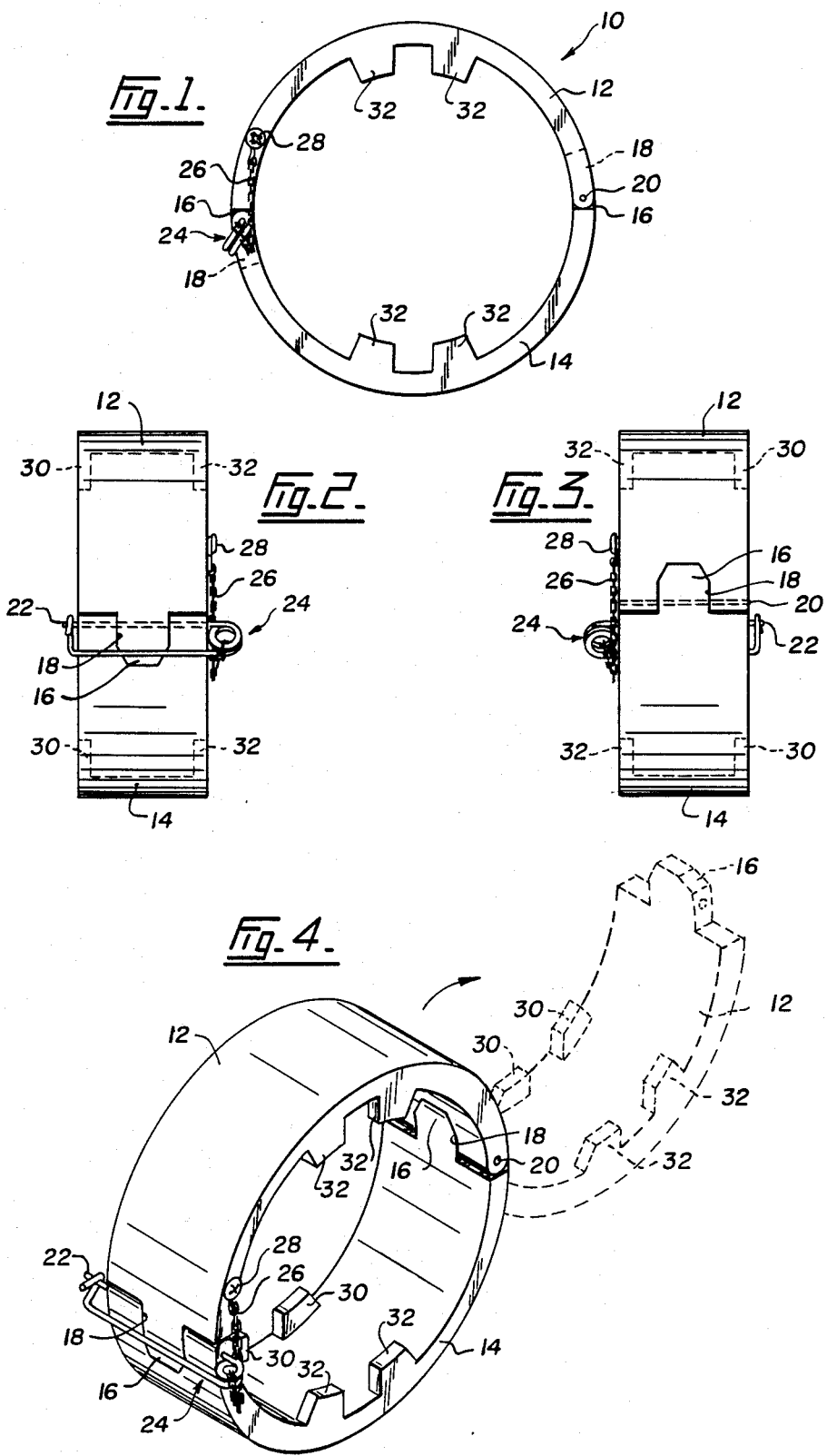

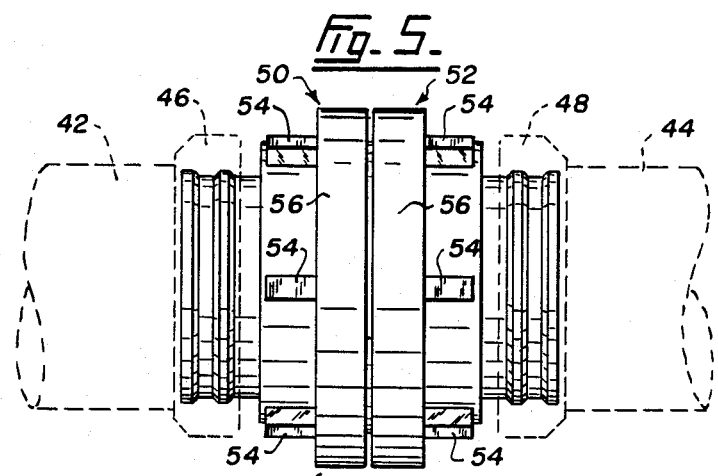
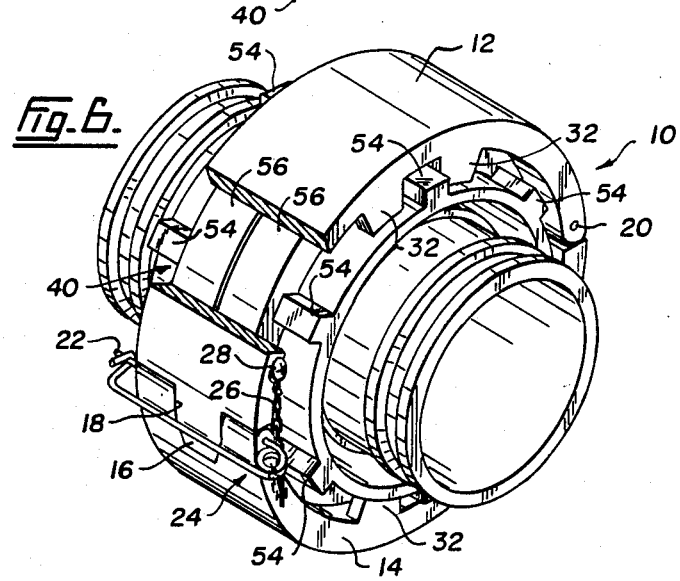
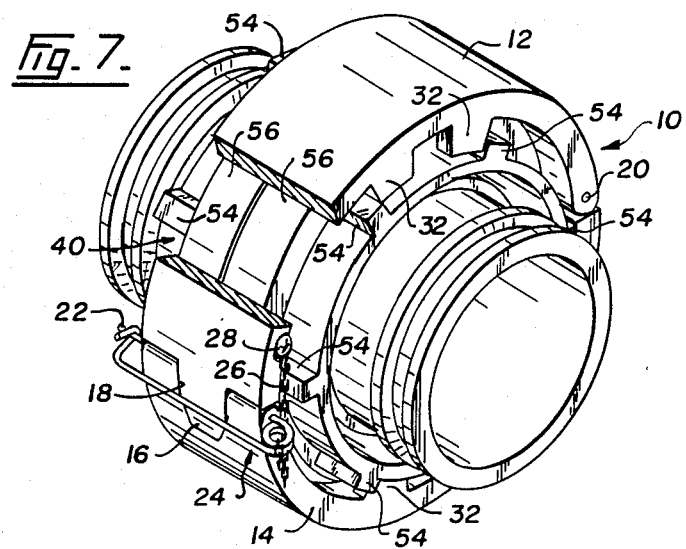

HOSE COUPLING LOCK

FIELD OF THE INVENTION

The present invention relates to a locking device or annular retainer for securing together the components of a firehouse coupling and is useful, in particular, for use with a conventional firehouse coupling of the Storz-type.

BACKGROUND OF THE INVENTION

As will be well known to those skilled in the art, a Storz-type coupling has a pair of coupling components which are coupled together and rotated so as to secure such components together, e.g. for connecting together a pair of hoses connected to respective ones of the coupling components or for securing a hose to a fire pump on a firetruck.

As is also known to those skilled in the art, it sometimes happens that, as a result of incorrect rotation of the coupling parts when they are connected together, and/or as a consequence of twisting in the hose from the laying of the hose or from the design of the hose, the coupling tends to be automatically and accidently uncoupled when the hose is used. In this condition it should be born in mind that a large volume firehose may have a pressure of approximately 75 to 125 p.s.i., and also that the twisting is transmitted through the hose until it reaches the last coupling, i.e. the coupling connected to the pump of the firetruck or other pumping apparatus.

Consequently, it is found that the coupling is sometimes caused to back off and release. This results in a potentially lethal uncontrolled large volume hose at pressure in the work area of operators already functioning under emergency conditions.

Proposals have, in the past, been made for releasably securing or locking together the two components of a Storz firehose coupling for counteracting such accidental release of the coupling.

Thus, U.S. Pat. No. 4,648,630, issued Mar. 10, 1987 to George H. Bruch discloses a firehose coupling locking device which is permanently attached to a collar on the highpressure outlet side of a fire pumper and is pivotable so as to span the coupling pieces of the firehose and to engage the collar on the firehose and, thereby, to prevent relative rotation of the collars when water under high pressure is forced through the coupling.

This prior locking device, however, has a disadvantage that it cannot be used satisfactorily to couple a pair of hoses, since the locking device would tend to be displaced and released if the coupled hoses, together with the locking device, were dragged along the ground.

BRIEF SUMMARY OF THE INVENTION

It is accordingly an object of the present invention to provide a novel and improved locking device or annular retainer for use with a firehouse coupling which is suitable for use between a pair of hoses and, also, between a hose and a fire pump on a firetruck or other pumping equipment.

According to the present invention, there is provided a locking device for a firehose coupling comprising first and second generally semi-cylindrically shaped members for embracing the coupling the semi-cylindrically shaped members each having first projections extending inwardly of the device for retainingly engaging second projection on the firehose coupling; means for releasably securing the first and second members around the firehouse complying with the first projections in retaining engagement with the second projection.

Thus, the present device fits in the manner of a bracelet around the coupled components of the firehose coupling, with the first projections supply interengaging the second projection so as to prevent relative rotation of the coupling components of the firehose coupling and, thus, to prevent accidental and possibly extremely dangerous release of the firehose coupling.

BRIEF DESCRIPTION OF THE DRAWINGS

The invention will be more readily understood from the following description of a preferred embodiment thereof given, by way of example, with reference to the accompanying drawings, in which:

FIG. 1 shows a view in side elevation of a locking device embodying the present invention;

FIGS. 2 and 3 show views in elevation from opposite sides of the locking device of FIG. 1;

FIG. 4 shows a view in perspective of the locking device of FIG. 1;

FIG. 5 shows a view in side elevation of a conventional quick-acting Storz firehouse coupling;

FIG. 6 shows a broken-away view of the locking device of FIGS. 1 to 4 in locking engagement around the firehose coupling of FIG. 5, with the locking device in a first position relative to the firehose coupling;

FIG. 7 shows a view corresponding to FIG. 6 but with the locking device in a different position relative to the firehose coupling.

DESCRIPTION OF THE PREFERRED EMBODIMENT

The locking device or annular retainer illustrated in FIG. 1 the accompanying drawings and indicated generally by reference numeral 10 is formed by two concavely curved components in the form of first and second generally semicylindrically shaped members 12 and 14, which are similar to one another.

Each of the first and second members 12 and 14 is formed at one end with an outwardly projecting tongue 16 and, at its opposite end, there is a corresponding cut-out or recess 18, which is snugly shaped to receive and interfit with the tongue of the other of these two members.

A pivot pin 20 extending through borings in the recessed end of the first member 12 and through an aligned boring (not shown) in the tongue 16 of the second member 14 pivotally secures together the respective ends of the first and second members 12 and 14.

A retaining pin 22 is inserted through similar borings in the opposite ends of the first and second members 12 and 14 for releasably securing together such opposite ends.

The retaining pin 22 is part of a spring clip indicated generally by reference numeral 24, which serves to releasably retain the retaining pin 22 in the borings in the first and second members 12 and 14. When the retaining clip 24 is disengaged so as to allow the retaining pin 22 to be extracted longitudinally along these borings and, thus, to allow the corresponding ends of the first and second members 12 and 14 to be spread apart, that the first member 12 can be displaced into the position in which it is shown in broken lines in FIG. 4.

A short retaining chain 26, secured at one end to the retaining clip 24, is anchored at its opposite end by means of a retaining screw 28 to the first member 12 and serves to prevent a retaining clip 24 from being inadvertently mislaid.

Each of the first and second members 12 and 14 is formed with a pair of inwardly extending projections 30 and a second pair of inwardly extending projections 32, which are spaced apart transversely of the respective first and second members, for the purpose explained below.

Reference is now made to the conventional Storz-type firehose coupling illustrated in FIG. 5. In this figure, the firhose coupling, which is indicated generally by reference numeral 40, serves to couple together two firehoses shown in broken lines and indicated by reference numerals 42 and 44, these 2 hoses being secured to the coupling by clamps 46 and 48, which are also, for convenience of illustration, shown in broken lines.

The firhose coupling 40 comprises two mating coupling halves or components indicated generally by reference numerals 50 and 52, which each comprises a collar having a of peripherally spaced, outwardly extending projections 54 extending in the longitudinal direction to an annular peripheral projecting portion 56.

The spacing between the projections 30 and 32 of the first and second members 12 and 14, in the transverse direction of the members 12 and 14, is such as to accommodate the annular peripheral projections 56 between the projections 30 and the projections 32 when the locking device is assembled and secured around the coupling 40, as shown in FIG. 6 or FIG. 7.

With the locking device 10 in its locking position, in which the first and second members 12 and 14 extend in the manner of a bracelet around the coupling components 50 and 52 of the coupling 40, the inwardly extending projections 30 and 32 of the locking device retainingly engage the outwardly extending projections 54 of the firehose coupling components 50 and 52 and, thus, securely prevent relative rotation, and the consequential release and uncoupling, of the coupling components 50 and 52.

The projections 30 and 32 are dimensioned and arranged in spaced pairs so as to either snugly receive one of the outwardly extending projections 54 between a respective pair of the projections 30 or 32, as shown in FIG. 6, or, alternatively, so as to be snugly received between a pair of the outwardly extending projections 54, as illustrated in FIG. 7. In this way, the locking device 10 is adapted for use with firehose coupling components having different numbers of outwardly extending projections 54, and thus the projections 54 do not need to be aligned longitudinally of the coupling, as illustrated in FIG. 5, but on the contrary can be circumferentially offset from one another.

As will be apparent to those skilled in the art, modifications may be made in the above described embodiment of the invention within the scope of the accompanying claims.

I claim:

1. A locking device for securing together two coupled components of a firehose coupling, said locking device comprising first and second generally semicylindrically shaped members for embracing the coupling; said semi-cylindrically shaped members each having first projections extending inwardly of said device for retainingly engaging second projections on each of the coupled components of said firehose coupling; to prevent relative rotation of the fire hose coupling and said locking device, in a locking condition of the first and second members; and
means for releasably securing said first and second members around said firehose coupling in said locking condition.

2. A locking device as claimed in claim 1, whereas said means for releasably securing comprise means for pivotally connecting together said first and second members at one end of each of said members.

3. A locking device as claimed in claim 1, wherein said first and second members have mutually interengageable end portions and said means for releasably securing comprise a retainer engageable in a locking position in said end portions and means for releasably securing said retainer in said locking position.

4. A locking device as claimed in claim 1, wherein said first projections include first and second groups of projections which are spaced apart transversely of said first and second members for receiving there between a cylindrical projection on the firehose coupling.

5. A locking device as claimed in claim 1, wherein said first projections comprise pairs of projections each dimensioned and spaced apart so as to receive one of the second projections snugly therebetween.

6. A locking device as claimed in claim 1, wherein said first projections comprise pairs of projections each dimensioned and spaced apart so as to fit snugly between a pair of the second projections.

7. An annular retainer for locking together two coupled components of a firhose coupling having peripherally spaced outwardly extending projections, said retainer comprising:
concavely curved components for arrangement in the form of a bracelet around the coupled components;
said curved components each having inwardly extending projections for interengagement with the outwardly extending projections; and
means for releasably securing said curved components around the coupled components with said inwardly extending projections retainingly engaging the outwardly extending projections so as to prevent uncoupling rotation of the coupled components relative to one another and relative to said retainer.

8. An annular retainer as claimed in claim 7, wherein said curved components are semi-cylindrical and said securing means comprise means for securing together said curved components at opposite ends of said curved components.

9. An annular retainer as claimed in claim 8, wherein said inwardly extending projections are distributed on each of said curved components in peripherally-spaced pairs which are dimensioned to snugly receive therebetween one of the outwardly extending projections in one position of the respective curved component relative to the firehose coupling and to be snugly received between a pair of the outwardly extending projections in another position of the respective curved component relative to the firehose coupling.

10. An annular retainer as claimed in claim 9, wherein said inwardly extending projections are spaced apart transversely of said curved components for receiving therebetween a peripherally projecting annular portion of the firehose coupling.

* * * * *